April 28, 1942.　　　D. W. PHILLIPS　　　2,280,927
MEANS AND APPARATUS FOR PREPARING INLAY CAVITIES
Filed July 2, 1941
Fig.1ª.
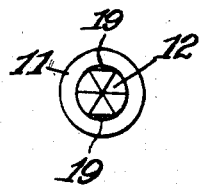
Fig.2ª.
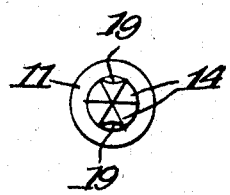
Fig.3ª.
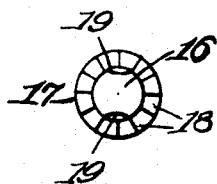
Fig.1.
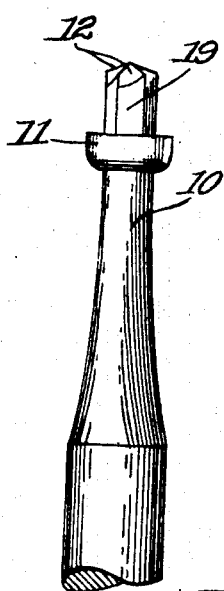
Fig.2.
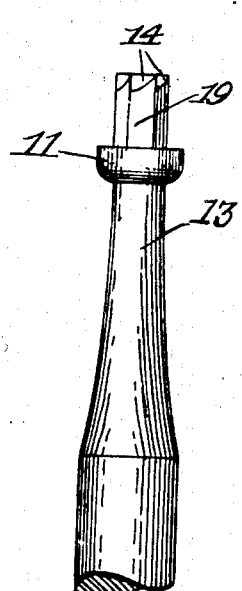
Fig.3.
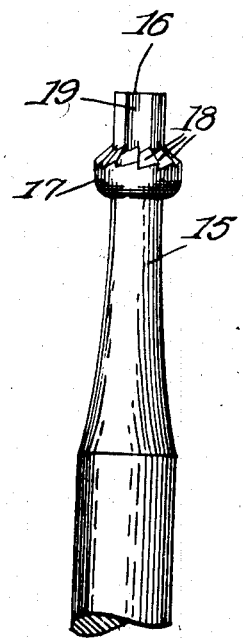
Fig.4.
Inventor:
David W. Phillips,
Dawson, Ooms & Booth,
Attys.

Patented Apr. 28, 1942

2,280,927

UNITED STATES PATENT OFFICE 2,280,927

MEANS AND APPARATUS FOR PREPARING INLAY CAVITIES

David W. Phillips, Chicago, Ill.

Application July 2, 1941, Serial No. 400,737

3 Claims. (Cl. 32—48)

This invention relates to a method and apparatus for preparing tooth cavities for inlays, etc.

The present application constitutes a continuation-in-part of my co-pending application, Serial No. 289,319, filed August 9, 1939, for Means and apparatus for preparing inlay cavities.

Ordinarily, it is the practice in dentistry to prepare a cavity in a tooth first and then to cast an inlay of the same dimensions to fit the cavity. The object of this invention is to facilitate the reverse procedure of first providing ready-made cylindrical precision inlays of selected sizes and then preparing cavities of their exact size and shape by an improved method and means for preparing such cavities of the exact predetermined dimensions. A further object is to provide a series of burs and steps whereby cavities of the exact predetermined dimensions are readily obtained. A still further object is to provide mechanism which enables the desired cavities to be formed with precision and ease. Other specific objects and advantages will appear as the specification proceeds.

The invention is illustrated, in preferred embodiments, by the accompanying drawing, in which—

Figure 1 is a broken side view in elevation of a novel dental bur with a shoulder employed as a part of my invention; Fig. 1ª, an end view of the same; Fig. 2, a broken side view in elevation of another novel end-cutting bur with a shoulder; Fig. 2ª, an end view of the bur shown in Fig. 2; Fig. 3, a broken side view in elevation of a cavo-surface bevel-cutting bur; Fig. 3ª, an end view of the bur shown in Fig. 3; and Fig. 4, a side view in elevation of a pin or inlay which may be introduced into the cavity after it is formed and cemented therein.

In the illustration given, 10 designates a dental bur which is useful in the initial step of forming the cavity. It will be noted that the bur is provided with a depth-limiting shoulder member 11. The end of the bur is provided with inclined teeth 12 which facilitate the ready starting of the cavity at an exact point and the forming of the main part thereof.

The end-cutting tool 13 is likewise provided with a shoulder 11. The teeth 14 are formed on the end of the tool so as to provide the cavity with a flat and even floor adapted to receive the flat end of the dental pin later to be inserted.

The third dental bur 15 is provided with a smooth cylindrical depth-limiting shank 16 with its end conforming to the floor of the cavity. The instrument is provided with a shoulder 17 having bevel-cutting teeth 18.

Each of the structures shown is provided with a pair of oppositely-disposed debris escapes 19. The debris escapes may be of different shapes and contours and may be located in different positions. For example, the debris escapes shown in Figs. 1 and 1ª are straight cut-away portions extending a substantial distance across the sides of the bur. In order to provide very rapid escape of the debris to prevent frictional heat which can injure the pulp of the teeth immediately below, it is often desirable to cut away the portions 19 so that the finished cutting end of the tool is substantially oblong in shape.

While the debris escapes may be of any desired type which are sufficient for eliminating the debris and for cooling the interior of the opening as the drill rotates, I find that the types of debris escapes illustrated are extremely effective in accomplishing these results. The escapes not only rapidly throw out the loose material, but also cause the air to circulate downwardly to the portion being cut away. Further, there is no tendency for the material to clog and thus interfere with the cutting operation or the function of the shoulder 11 determining the proper depth of the cavity.

It is important that the debris escapes terminate at the depth-limiting shoulder 11, that is, with the inner smooth surface thereof so that there is no opportunity for particles to become trapped against the shoulder or between the edges of the debris escape and the depth-limiting shoulder. With the structure shown, the debris escape 19 terminates abruptly when it strikes the smooth surface of shoulder 11 so that there is no tendency for any material to be wedged near the shoulder and thus prevent the shoulder from performing its important function of determining the depth of the cavity.

The cutting knives 12 and 14, as illustrated in Figs. 1ª and 2ª are arranged in a circular form about the central point. With this structure, the material cut away is in relatively small fragments and readily sifts through the debris escapes and is ejected. The rotating smooth shoulders 11 tend to assist in throwing laterally the debris when it touches them.

In the structure shown in Fig. 3ª, the cutting teeth are arranged in an annular position, the stop member being the flat bottom 16 of the core shaft.

The dental burs shown each has a main shaft or shank portion adapted to be received in a dental hand-piece. The main shaft portion tapers inwardly toward the shoulder 11. The shoulder 11 tapers outwardly toward the smooth undersurface of the shoulder. With the structure shown, it is easy for the dentist to see the operation of the bur, a minimum of metal being employed.

In the operation of the structures shown in Figs. 1, 2 and 3, I first use the rounded or pointed instrument 10 for starting a cavity at an exact point, the shoulder 11 limiting the depth thereof. Next, the instrument 13 is employed for forming a flat floor for the cavity. Lastly, the bevel on the cavity for receiving the bevel of the inlay pin is formed by the member 15. Here, however, it is the smooth end of the cylindrical shank which is the depth-limiting factor. This non-cutting shank holds the tool in perfect alignment so that the beveled form is accurately related to the shank, with the result that the inlay pin, when later inserted, exactly fits the cavity.

In order to limit the diameter of a cylindrical cavity to the exact diameter of the cylindrical inlay, it is necessary to use a smooth-sided end-cutting bur or drill of the same diameter as the inlay.

It is extremely difficult to control exactly the depth to which the ordinary end-cutting bur cuts. Cutting beyond the exact depth to which the inlay reaches results in needless destruction of tooth structure, endangers the dental pulp, and produces a poor marginal adaptation of the inlay where it joins the cavity margins on the surface of the tooth.

Insufficient cavity depth does not permit the inlay to seat properly, and this prevents a perfectly flush marginal adaptation of the inlay at the external margins of the cavity for the prevention of dental decay on the surface. The smooth shoulder 11, however, limits the cavity to the exact predetermined depth. When the shoulder reaches the surfaces of the tooth, the depth cutting is limited to the distance of the shoulder from the cutting end of the bur. By making this dimension of the bur equivalent to the depth to which the inlay extends, a cavity truly precise in desired depth as well as diameter is quickly and easily prepared.

It will be noted that the depth-limiting shoulder is also useful on other types of dental burs, drills and stones, to prevent their cutting too deeply and endangering the dental pulp. The dental tool may be flat, pointed, or rounded. By the term "dental bur," as used herein, I include all types of drills employed in a dental handpiece with teeth cut in metal, diamond, etc., and with abrasive-impregnated grinding surfaces.

It is desirable for biological and mechanical reasons that cavities have beveled margins. Therefore, the cylindrical inlays are preferably made originally with beveled heads.

For use after the cylindrical precision cavity of diameter and depth equal to the inlay diameter and length has been prepared, I have designed the bur 15 with the object of cutting accurately a bevel on the margins of the cavity exactly to fit the beveled head of the inlay without danger of cutting any other part of the cavity.

This tool has a circular bevel-cutting surface 18 around its sides conforming exactly to the cavo-surface bevel of the inlay, for cutting an exact bevel on the cavity margin.

The shank or cylinder 16, which extends from the circular cutting surface 18, has smooth sides and end of the same diameter and length as the cylindrical part of the inlay. Thus, the cylinder and bevel-cutting surface are of exact inlay shape and dimensions. The shank or smooth projecting cylinder 16 serves the following purposes: it prevents any side-cutting of the cavity except the desired bevel; it prevents any deepening of the cavity; it facilitates correct placement of the drill at the exact angle at which the cylindrical part was originally drilled; and it stops the bevel cutting of the margin at the exact point necessary to conform to the dimensions of the inlay.

The cutting teeth 12 and 14 at the ends of the shafts shown in Figs. 1ª and 2ª cut away the material in small fragments so that they can be readily removed through the debris escapes, the teeth being arranged in a circular form about a central point. The large debris escapes extending along parallel opposite sides readily throw out the fragments. The fragments upon reaching the undersurface of the shoulder 11 are thrown out by the shoulder as a result of centrifugal action. At the same time, the wide debris escapes reduce frictional heat and lateral frictional contact with the cavity walls.

In all of the structures shown, including Figs. 1, 2 and 3, the debris escapes terminate on reaching the shoulder. In Figs. 1 and 2, the debris escapes terminate flush with the under-smooth surface of the shoulder 11. In Fig. 3, the debris escapes 19 terminate at the edge of the cutting teeth 18. If desired, the debris escape may be omitted in the structure shown in Fig. 3. There is no recess or cavity in which material cut by the teeth can become wedged so as to prevent the functioning of the parts.

A suitable inlay pin adapted to fit the cavity described is illustrated in Fig. 4, the cylinder or shank portion being designated by the numeral 24 and the beveled head or skirt by the numeral 25.

While in the foregoing description, I have set forth details, it will be noted that wide variation can be made therein without departing from the spirit of my invention. For example, should my inlay be in the form of a cylinder, the bevel-cutting tool may be omitted.

I wish it to be understood that I do not desire to be limited to the exact details of construction shown and described, for obvious modifications will occur to a person skilled in the art.

I claim:

1. A dental bur, comprising a shaft provided at its end with circularly-disposed cutting knives, a non-cutting shank portion extending from said knives and having straight parallel portions cut away along lines parallel with the long axis of said shaft to form debris escapes, the edges formed by said debris escapes with said shank portion having obtuse angles, and a depth-limiting shoulder formed integrally with said shaft, said debris escapes terminating at said shoulder.

2. A dental bur, comprising a non-cutting shaft provided at its end with a circular series of cutting knives, the non-cutting shank portion of said shaft being cut away along opposite sides to form debris escapes parallel with the longitudinal axis of said shaft, and a shoulder formed integrally with said shaft and providing a smooth face against which said debris escapes terminate, said shank portion having a length less than twice its diameter.

3. A dental bur, comprising a shaft provided at one end with a circular series of cutting knives, a shoulder formed integrally with said shaft and spaced from said knife-equipped end, the shank between said end and said shoulder being of non-cutting conformation and having a length less than twice its diameter, said end and shank being cut away along opposite sides parallel with the longitudinal axis of the shank to provide straight debris escapes terminating against said shoulder, and said shoulder providing a smooth face extending at right angles to said debris escapes.

DAVID W. PHILLIPS.